(12) United States Patent
Cheong et al.

(10) Patent No.: US 10,915,672 B2
(45) Date of Patent: Feb. 9, 2021

(54) COMPUTER-IMPLEMENTED SYNTHESIS OF A FOUR-BAR LINKAGE

(71) Applicant: AUTODESK, INC., San Rafael, CA (US)

(72) Inventors: Hyunmin Cheong, Toronto (CA); Vincent Goulet, Quebec (CA); Wei Li, Toronto (CA); Francesco Iorio, Toronto (CA); Claude-Guy Quimper, Quebec (CA)

(73) Assignee: AUTODESK, INC., San Rafael, CA (US)

( * ) Notice: Subject to any disclaimer, the term of this patent is extended or adjusted under 35 U.S.C. 154(b) by 368 days.

(21) Appl. No.: 15/693,290

(22) Filed: Aug. 31, 2017

(65) Prior Publication Data

US 2019/0065661 A1    Feb. 28, 2019

(51) Int. Cl.
| | | |
|---|---|---|
| *A47B 57/00* | (2006.01) | |
| *G06F 30/17* | (2020.01) | |
| *A47B 55/00* | (2006.01) | |
| *G06F 111/04* | (2020.01) | |

(52) U.S. Cl.
CPC .............. *G06F 30/17* (2020.01); *A47B 55/00* (2013.01); *A47B 57/00* (2013.01); *G06F 2111/04* (2020.01)

(58) Field of Classification Search
CPC ...... G06F 17/5086; F16H 21/14; A61F 5/103; B60P 1/28; B65F 3/043; B62K 25/286; B23K 37/04; B26B 19/102; B25J 9/1605
See application file for complete search history.

(56) References Cited

U.S. PATENT DOCUMENTS

| | | | | |
|---|---|---|---|---|
| 4,416,198 A | * | 11/1983 | Rasenberger | F16H 21/40 101/142 |
| 5,043,929 A | * | 8/1991 | Kramer | G06F 30/17 703/1 |
| 5,297,057 A | * | 3/1994 | Kramer | G06F 17/5086 345/953 |
| 5,320,208 A | * | 6/1994 | Mason | B23K 37/04 198/346.2 |

(Continued)

OTHER PUBLICATIONS

Osmanlioglu lu et al, "Multilayer matching of metric structures using hierarchically well-separated trees" 2016.*

(Continued)

*Primary Examiner* — Kandasamy Thangavelu
(74) *Attorney, Agent, or Firm* — Artegis Law Group, LLP

(57) ABSTRACT

One embodiment of the present invention sets forth a technique for designing a four-bar linkage mechanism. The technique includes receiving an input coupler curve that defines motion within a plane with respect to a point that is to be included on the four-bar linkage mechanism; generating a set of sample points, wherein each point in the set of sample points corresponds to a different location on the input coupler curve; and implementing a global optimization solver to generate a first design for the four-bar linkage mechanism. The first design includes at least one value for each geometric variable included in a set of geometric variables associated with the four-bar linkage, where at least one of the geometric variables is based on one of the sample points. The first design generates an output coupler curve that approximates the input coupler curve.

21 Claims, 8 Drawing Sheets

(56) References Cited

U.S. PATENT DOCUMENTS

| | | | | |
|---|---|---|---|---|
| 5,377,307 | A | * | 12/1994 | Hoskins ................. B25J 9/1605 706/19 |
| 5,423,125 | A | * | 6/1995 | Wetzel ................. B26B 19/102 30/34.1 |
| 5,628,524 | A | * | 5/1997 | Klassen ............... B62K 25/286 280/283 |
| 5,772,385 | A | * | 6/1998 | Huntoon ................. B65F 3/043 414/408 |
| 2009/0185886 | A1 | * | 7/2009 | Janzen ..................... B60P 1/28 414/585 |
| 2014/0263122 | A1 | * | 9/2014 | Roberts ................. A47B 51/00 211/88.01 |
| 2017/0079825 | A1 | * | 3/2017 | Plecnik .................. A61F 5/013 |

OTHER PUBLICATIONS

Liu et al., "Using artificial reaction force to design compliant mechanism with multiple equality displacement constraints", 2009.*

Acharyya et al, "Performance of EAs for four-bar linkage synthesis", 2009.*

Wu, Jun, "Variational Kinematic Geometry for Task Centered Design of Mechanisms and Robotic Systems", Stony Brook University, Dec. 2010.*

Lin, W., "A GA-DE hybrid evolutionary algorithm for path synthesis of four-bar linkage", 2010.*

Kim et al., "A new design methodology for four-bar linkage mechanisms based on derivations of coupler curve", 2016.*

Hoskins et al., "Synthesis of Mechanical Linkages Using Artificial Neural Networks and Optimization", 1993.*

Vincent Goulet, "Four-Bar Linkage Synthesis Using Non-Convex Optimization", 2017.*

Coupler Curve 1, "Google search 1 for : what is a coupler curve of four-bar linkage?", Feb. 2020.*

E.v. Thomas, "Development of a mechanism for transplanting rice seedlings", Mechanism and Machine Theory, 2002.*

Ibex library online documentation, http://www.ibex-lib.org/doc/. Snapshot dated Aug. 18, 2017 retrieved from https://web.archive.org/web/20170818182732/http://www.ibex-lib.org/doc/, 4 pages.

Acharyya et al., "Performance of EAs for four-bar Linkage Synthesis", Mechanism and Machine Theory, vol. 44, No. 9, Apr. 14, (2009), pp. 1784-1794.

Achterberg, Tobias, "SCIP: Solving Constraint Integer Programs", http://mpc.zib.de/index.php/MPC/article/view/4, Mathematical Programming Computation, vol. 1(1), Jan. 20, 2009, pp. 1-41.

Androulakis et al., "alphabb: A Global Optimization Method for General Constrained Nonconvex Problems", 1995, pp. 1-27.

Belotti et al., "Branching and bounds tightening techniques for non-convex MINLP", Optimization Methods and Software, vol. 24, Nos. 4-5, Aug.-Oct. 2009, pp. 597-634.

Bulatovic et al., "Optimal Synthesis of a Four-Bar Linkage by Method of Controlled Deviation". Theoretical and applied mechanics, vol. 31, No. 3-4, 2004, pp. 265-280.

Cabrera et al., "Optimal synthesis of mechanisms with genetic algorithms", Mechanism and Machine theory, vol. 37, No. 10, Apr. 10, 2002, pp. 1165-1177.

Coros et al., "Computational design of Mechanical Characters", ACM Transactions on Graphics, vol. 32, No. 4, Article 83, Jul. 2013, pp. 83:1-83:12.

Granvilliers et al., "Algorithm 852: RealPaver: An Interval Solver Using Constraint Satisfaction Techniques". ACM Transactions on Mathematical Software, vol. 32, No. 1, Mar. 2006, pp. 138-156.

Hoeltzel et al., "Pattern Matching Synthesis as an Automated Approach to Mechanism Design". Journal of Mechanical Design, vol. 112, No. 2, Jun. 1990, pp. 190-199.

Kinzel et al., "Function Generation With Finitely Separated Precision Points Using Geometric Constraint Programming". Journal of Mechanical Design, vol. 129, Nov. 2007, pp. 1185-1190.

Lin et al., "The global solver in the Lindo API". Optimization Methods Software, vol. 24, Nos. 4-5, Aug.-Oct. 2009, pp. 657-668.

O'Sullivan et al., "A Constraint-Based Approach to Supporting Conceptual Design". In Artificial Intelligence in Design'98, 1998, pp. 291-308.

Radhakrishnan et al., "A Graph Grammar Based Scheme for Generating and Evaluating Planar Mechanisms", In Design Computing and Cognition'10, 2011, pp. 663-679.

Stockli et al., "A Simulation-Driven Graph Grammar Method for the Automated Synthesis of Passive Dynamic Brachiating Robots", In ASME 2015 IDETC/CIE Conferences. American Society of Mechanical Engineers, Aug. 2-5, 2015, 11 pages.

Subramanian, Devika, "Conceptual design and Artificial Intelligence", In Proceedings of IJCAI'93, San Francisco, CA, USA, 1993. Morgan Kaufmann Publishers Inc., pp. 800-809.

Subramanian et al., "Kinematic Synthesis with Configuration Spaces", Research in Engineering Design, vol. 7, No. 3, 1995, pp. 193-213.

Tawarmalani et al., "A polyhedral branch-and-cut approach to global optimization". Mathematical Programming, vol. 103, May 3, 2005, pp. 225-249.

Unruh et al., "A Computer-Aided Design Technique for Semi-Automated Infinite Point Coupler Curve Synthesis of Four-Bar Linkages", Journal of Mechanical Design, vol. 117 No. 1, Mar. 1995, pp. 143-149.

Zhu et al., "Motion-Guided Mechanical Toy Modeling", ACM Transactions on Graphics, vol. 31, No. 6, Article 127, Nov. 2012, pp. 127:1-127:10.

Goulet, Vincent, "Four-bar Linkage Synthesis Using Non-Convex Optimization", International Conference on Principles and Practice of Constraint Programming. Springer, Cham, 2016, 95 pages.

* cited by examiner

COMPUTER-IMPLEMENTED SYNTHESIS OF A FOUR-BAR LINKAGE

BACKGROUND OF THE INVENTION

Field of the Invention

The present invention relates generally to computer-aided design and, more specifically, to computer-implemented synthesis of a four-bar linkage.

Description of the Related Art

A four-bar linkage is a simple movable closed-chain linkage that consists of four bodies, which are referred to as "bars" or "links." The links of a four-bar linkage are connected in a loop by four joints. In implementations where the joints are configured so that the four links move in parallel planes, the linkage is called a "planar" four-bar linkage. Four-bar linkages, in general, and planar four-bar links, in particular, are simple yet practically important mechanisms that can generate complex motions. The planar four-bar linkage has been widely applied in mechanical systems in various industries, including manufacturing, agriculture, robotics, and automotive.

One drawback of using four-bar linkages is that these mechanisms are usually designed manually, and manually designing a four-bar linkage to operate along a specific target curve can be a tedious and laborious process. Further, creating a four-bar linkage that meets specific geometric and output motion requirements typically necessitates a specifically trained expert designer who has the design knowledge and experience to generate a suitable mechanism design. Thus, the current state of the art is that four-bar linkage design is a time-consuming manual process that relies on highly specialized human resources.

As the foregoing illustrates, what is needed in the art are more effective techniques for designing a four-bar linkage that meets specific geometric and output motion requirements.

SUMMARY

One embodiment of the present invention sets forth a technique for designing a four-bar linkage mechanism. The technique includes receiving an input coupler curve that defines motion within a plane with respect to a point that is to be included on the four-bar linkage mechanism; generating a set of sample points, wherein each point in the set of sample points corresponds to a different location on the input coupler curve; and implementing a global optimization solver to generate a first design for the four-bar linkage mechanism. The first design includes at least one value for each geometric variable included in a set of geometric variables associated with the four-bar linkage, where at least one of the geometric variables is based on one of the sample points. The first design generates an output coupler curve that approximates the input coupler curve.

At least one advantage of the disclosed techniques is that a four-bar linkage or a set of four-bar linkages that operates along a desired output curve can be generated more quickly and with greater computational efficiency relative to prior art approaches. Further, because multiple mechanisms that produce the desired output curve can be generated, a designer can select a final design from among multiple design options based on secondary design constraints.

BRIEF DESCRIPTIONS OF THE DRAWINGS

Figure 1:
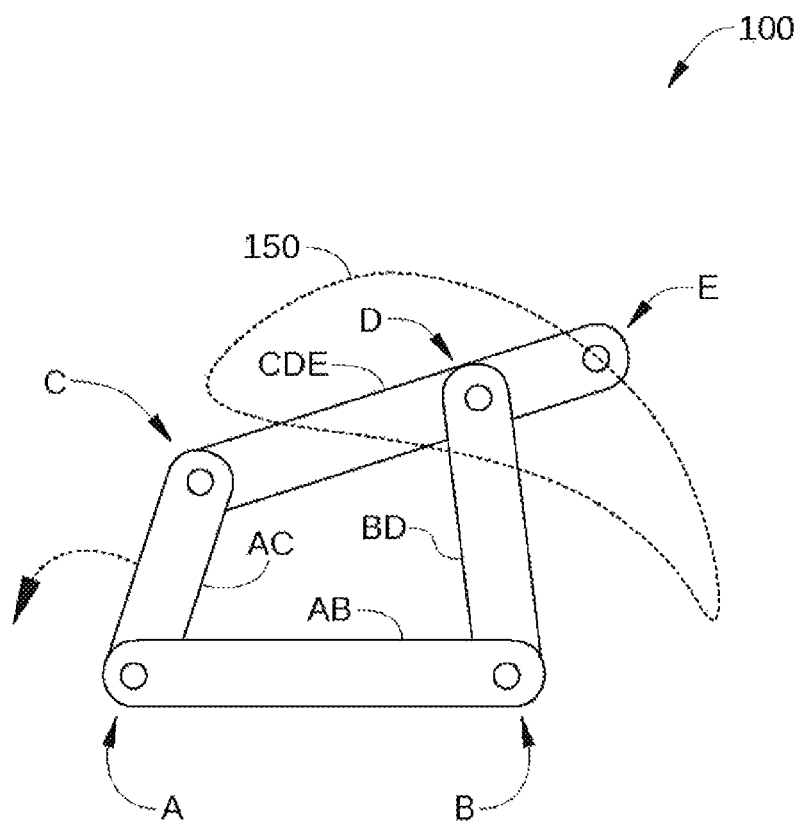
FIG. 1 is a block diagram of an exemplary four-bar linkage, according to various embodiments of the present invention.
Figure 4:
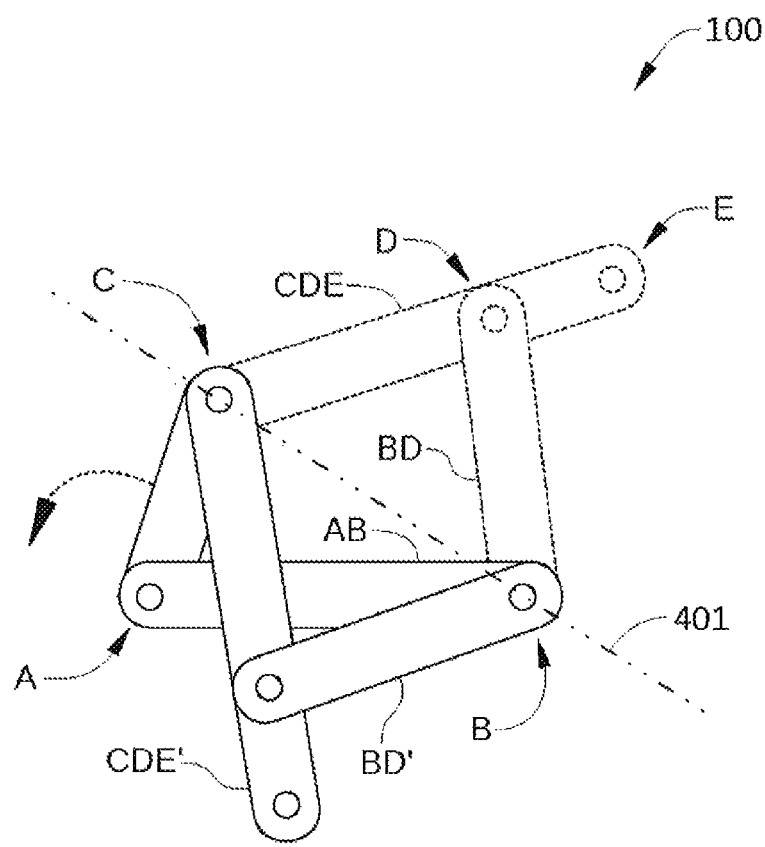

FIG. 4 schematically illustrates the four-bar linkage of FIG. 1 in a first operating configuration and a second operating configuration, according to various embodiments of the present invention.

Figure 5:
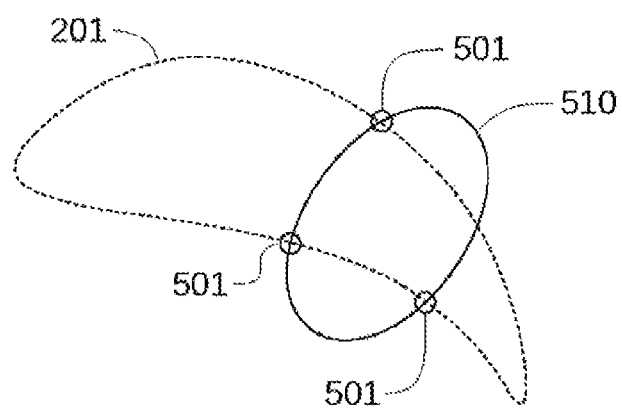

FIG. 5 schematically illustrates an input coupler curve that is approximated by four sample points, according to various embodiments of the present invention.

Figure 6:
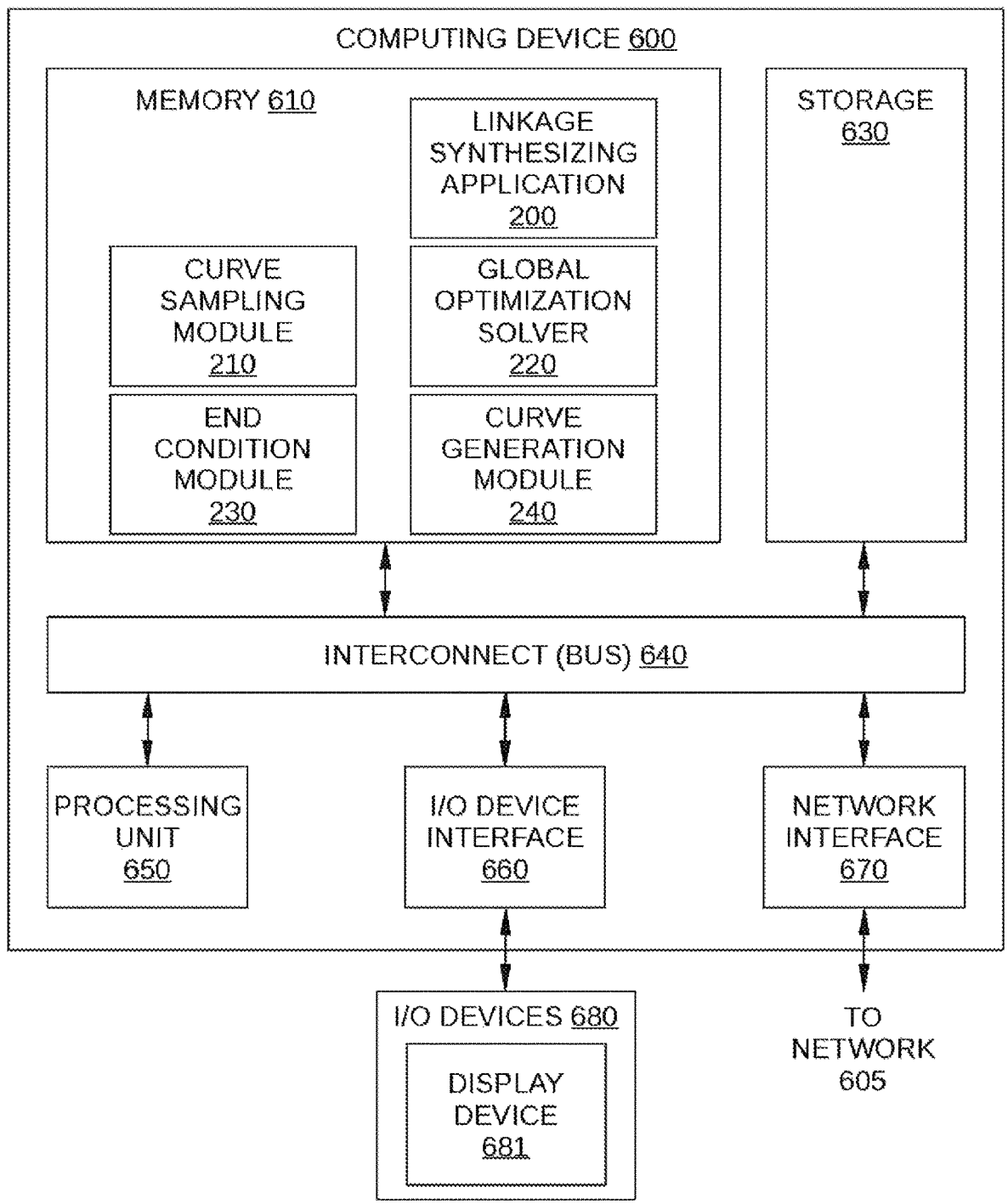

FIG. 6 illustrates a computing device configured to implement one or more aspects of the present invention.

Figure 7:
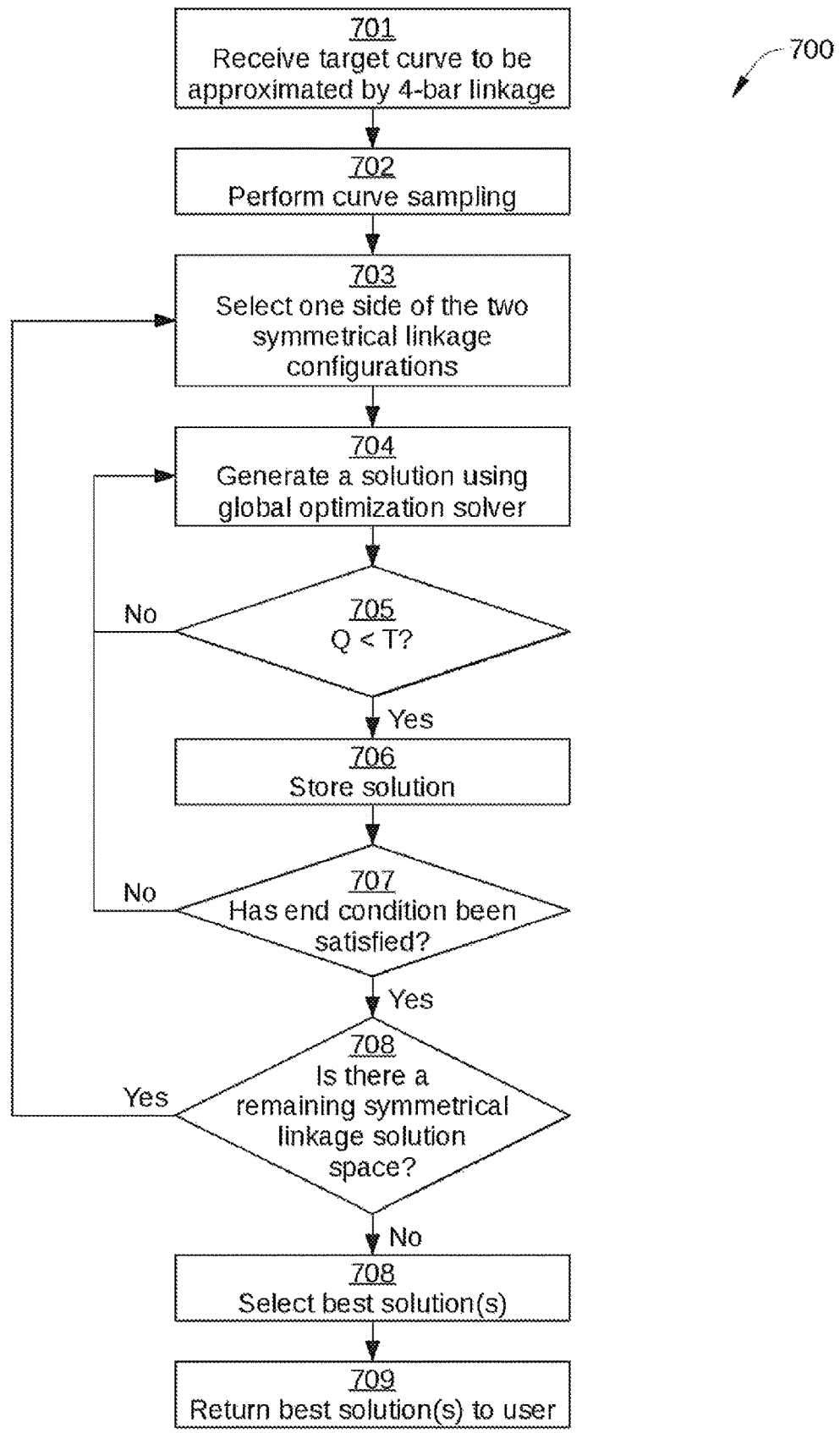

FIG. 7 is a flowchart of method steps for designing a four-bar linkage mechanism, according to various embodiments of the present invention.

Figure 8:
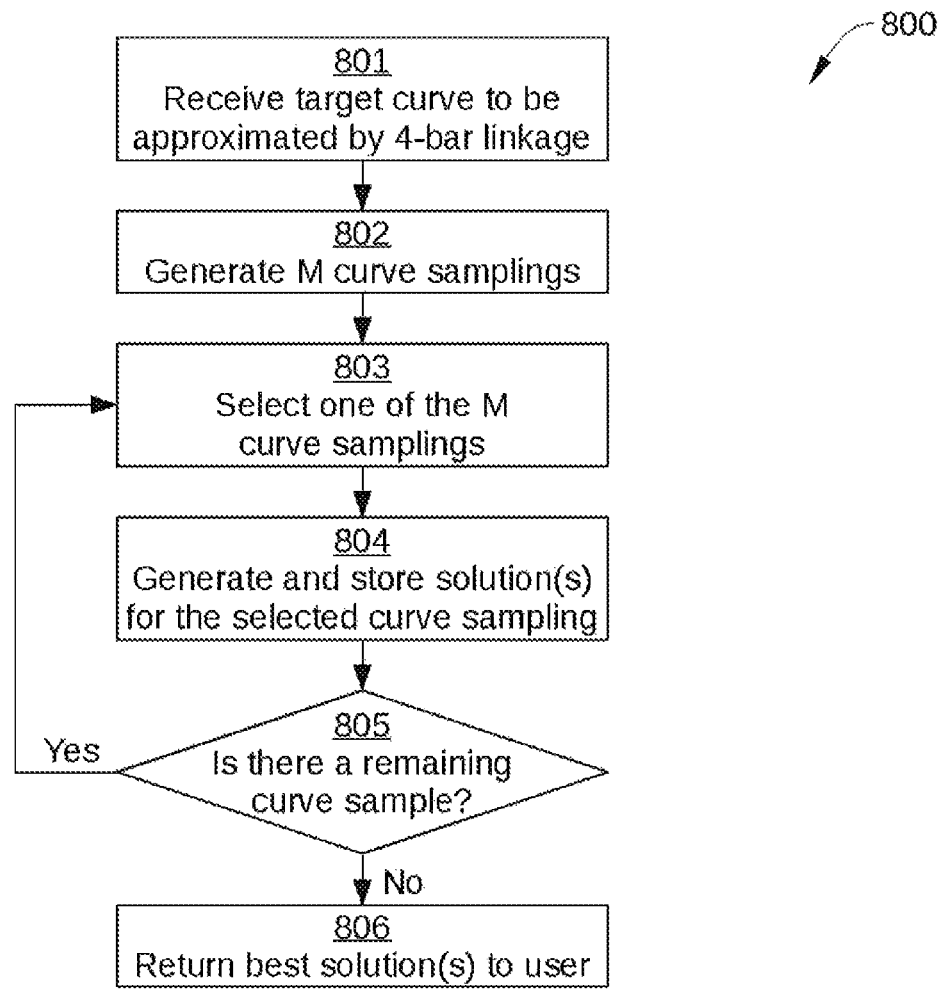

FIG. 8 is a flowchart of method steps for designing a four-bar linkage mechanism, according to various other embodiments of the present invention.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

FIG. 1 is a block diagram of an exemplary four-bar linkage 100, according to various embodiments of the present invention. Four-bar linkage 100 is a planar four-bar linkage, also referred to as a two-dimensional four-bar linkage. Four-bar linkage 100 includes four links connected in a loop by four revolute joints A, B, C, and D that each have one degree of freedom (rotation). Thus, four-bar linkage 100 includes a frame AB that is fixed and includes revolute joints A and B, a crank AC, which drives the motion of four-bar linkage 100 and includes revolute joints A and C, a rocker BD, which is driven back and forth about revolute joint B and includes revolute joints B and D, and a coupler CDE, which couples rocker BD to crank AC. Coupler CDE includes revolute joints C and D, as well as an effector E, which is the effector of four-bar linkage 100 and follows a coupler curve 150. Effector E follows coupler curve 150 when crank AC rotates as shown.

Figure 2:
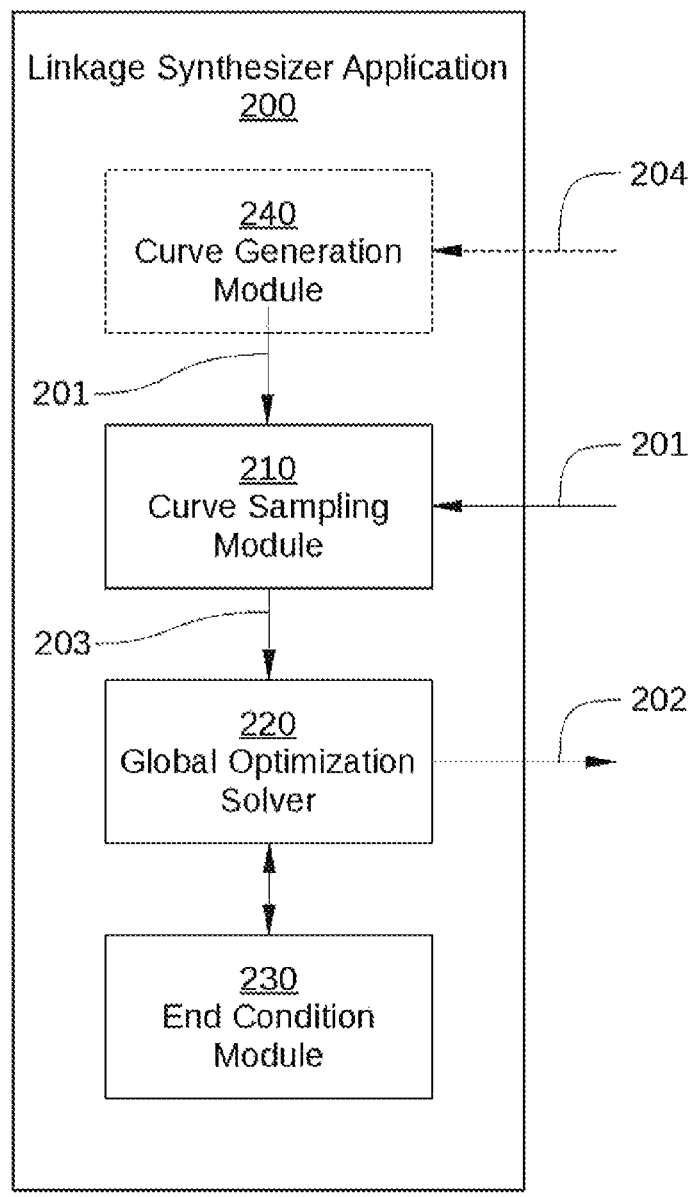
FIG. 2 is a block diagram of a linkage synthesizing application, according to various embodiments of the present invention.

FIG. 2 is a block diagram of a linkage synthesizing application 200, according to various embodiments of the present invention. Linkage synthesizing application 200 is configured to generate one or more four-bar linkage mechanisms that each produce or approximately produce a target coupler curve, such as coupler curve 150 in FIG. 1. Specifically, linkage synthesizing application 200 generates one or more four-bar linkage mechanisms 202 using the target coupler curve as an input coupler curve 201, and each of the one or more four-bar linkage mechanisms 202 generated by linkage synthesizing application 200 produces an output coupler curve that approximates the target coupler curve.

Linkage synthesizing application 200 includes a curve sampling module 210, a global optimization solver 220, and an end condition module 230. In some embodiments, linkage synthesizing application 200 further includes an optional curve generation module 240. In some embodiments, curve sampling module 210, global optimization solver 220, end condition module 230, and curve generation module 240 all execute on a single computing device. Alternatively, one or more of curve sampling module 210, global optimization solver 220, end condition module 230, and curve generation module 240 execute on separate computing devices, and are communicatively coupled via a suitable communication network (not shown).

Curve sampling module 210 is a software application configured to receive input coupler curve 201, for example in the form of one or more mathematical expressions, such as a B-spline. In some embodiments, curve sampling module 210 receives input coupler curve 201 from a user interface associated with linkage synthesizing application 200, whereas in other embodiments, curve sampling module 210 receives input coupler curve 201 from curve generation module 240, which is described below. Curve sampling module 210 is further configured to sample a high-resolution array of sample points or coordinates from input coupler curve 201, then choose n points from the array, where n is referred to as the sample number. The n points are then included as a sample curve 203 that is an input to global optimization solver 220 for generating four-bar linkage mechanisms that produce suitable output coupler curves.

A large value for sample number n generally improves the quality of four-bar linkage mechanisms 202 generated by global optimization solver 220, since global optimization solver 220 is thereby constrained to only return solutions (four-bar linkage mechanisms 202) that precisely follow input coupler curve 201. However, a large value for sample number n also greatly increases execution time of global optimization solver 220. Consequently, striking a compromise between limiting four-bar linkage mechanisms 202 to solutions that precisely follow input coupler curve 201 and facilitating faster generation of 202 can be beneficial. Thus, while any suitable point sampling techniques may be employed by global optimization solver 220 to generate sample curve 203, in some embodiments curve sampling module 210 generates one or more sample curves 203 that each have an optimized sample number n.

Figure 3:
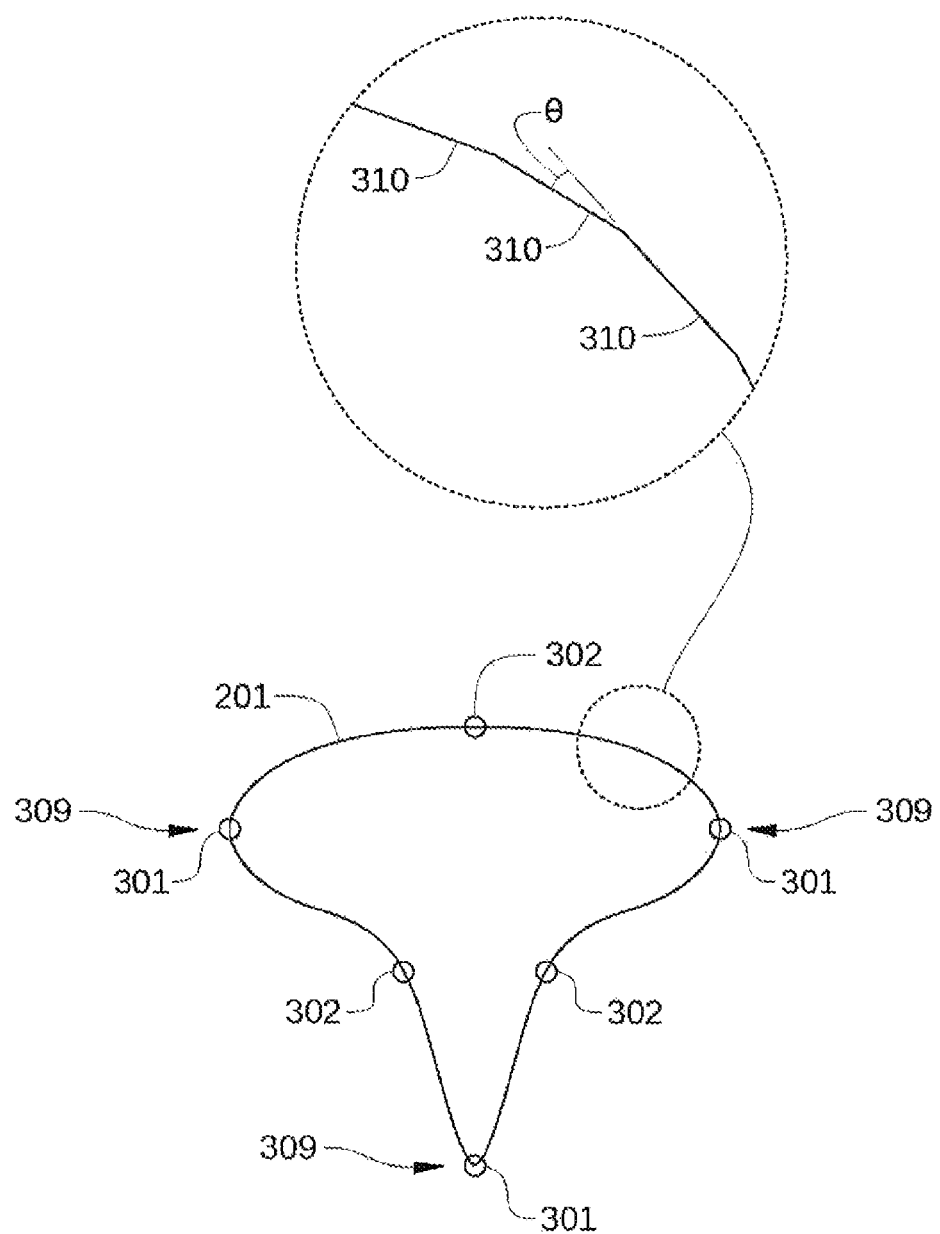
FIG. 3 shows an example input coupler curve and corresponding sample points, according to various embodiments of the present invention.

In one such embodiment, curve sampling module 210 minimizes or otherwise reduces a sample number n for a sample curve 203 that is based on input coupler curve 201. Specifically, curve sampling module 210 detects specific features of input coupler curve 201, assigns one of the n sample points to each detected feature, and evenly distributes the remaining n sample points across input coupler curve 201. In such embodiments, each cusp or sharp turn detected in input coupler curve 201 is determined to be a feature and is assigned one of the n sample points. One such embodiment is illustrated in FIG. 3. FIG. 3 shows an example input coupler curve 201 and corresponding sample points 301 and 302, according to various embodiments of the present invention. In the embodiment illustrated in FIG. 3, the sample number n for input coupler curve 201 is six, with three sample points 301 assigned to detected features 309 of input coupler curve 201 and three sample points 302 evenly distributed along input coupler curve 201. Thus, sample points 302 are assigned locations disposed between and substantially equidistant from sample points 301.

Any suitable algorithm can be employed to detect or otherwise identify features included in input coupler curve 201 to be assigned sample points 301. In some embodiments, maxima of curvature are detected. In such embodiments, actual curvature along input coupler curve 201 can be employed by curve sampling module 210 to detect features 309. However, actual curvature of input coupler curve 201 approaches infinity at cusps and reaches inconveniently high values at very sharp turns. Consequently, in some embodiments, curve sampling module 210 detects features by computing the change in angle θ between adjacent segments 310 of the high resolution pre-sampled array of points that make up input coupler curve 201. In such embodiments, segments 310 can be defined by the points of input coupler curve 201, or by line segments that approximate the path of input coupler curve 201. In some embodiments, curve sampling module 210 computes the squared change in angle θ between adjacent segments 310 of the high resolution pre-sampled array of points that make up input coupler curve 201. In such embodiments, the median absolute deviation from all squared angles θ can be computed, then, using the first derivative of θ2 with respect to the distance traveled on input coupler curve 201, local maxima, i.e., features 309, can be identified. When a large number of local maxima are detected, curve sampling module 210 may further employ filtering to reduce the total number of maxima eligible for consideration as a feature 309.

Returning to FIG. 2, curve sampling module 210 is further configured to input one or more sample curves 203 into global optimization solver 220, where each sample curve includes one or more sample points 301 assigned to features 309 of input coupler curve 201 and sample points 302 distributed along input coupler curve 201. In some embodiments, curve sampling module 210 inputs a single sample curves 203, whereas in other embodiments, curve sampling module 210 inputs a set of different sample curves 203, each generated based on a different sample number n. In either case, the sample number n associated with each sample curve 203 can be a user-selected value.

Global optimization solver 220 is a continuous solver software application configured to generate one or more four-bar linkage mechanisms 202 that each produce an output coupler curve approximating input coupler curve 201 to a satisfactory degree. More specifically, global optimization solver 220 employs any suitable global optimization techniques known in the art that can generate solutions, (four-bar linkage mechanisms 202), that are optimal in light of defined variables, variable ranges, and constraints. Examples of solvers suitable for use as global optimization solver 220 include Couenne, Baron, AlphaBB, and IBEX, among others.

Generally, for global optimization problems to be computable, the problem is modeled mathematically with a set of real variables, a set of non-convex constraints, and an objective function. In addition, global optimization solver 220 implements relaxation techniques known in the art to form an efficiently solvable problem. Further, to ensure that effector E follows an output coupler curve that is as close as practicable to input coupler curve 201, the mathematical model employed in global optimization solver 220 minimizes the distance between the output coupler curve and the input coupler curve 201 when effector E passes through each of the n sample points. Thus, global optimization solver 220 finds or solves for a four-bar linkage mechanism and computes n positions for this mechanism, where each such position brings effector E close to the corresponding sample point in input coupler curve 201. To that end, the mathematical model employed in global optimization solver 220 includes geometric variables, one or more geometric constraints, and an objective function, which are described below.

A planar four-bar linkage is defined by eight parameters or variables, including the x- and y-coordinates of revolute joints A and B (denoted Ax, Ay, Bx, and By), the lengths of crank AC (denoted AC) and rocker BD (denoted BD), the distance from revolute joint C to revolute D (denoted CD), and the distance from revolute joint C to effector E (denoted CE). A solution generated by global optimization solver 220 is interpreted directly from the values of the above variables.

In some embodiments, one or more redundant variables are also employed by global optimization solver 220, including the variable AB, which represents the distance between revolute joints A and B, and the variable w, which gives the ratio of length CE over CD. In addition, the mathematical model included in global optimization solver 220 includes a variable for each x- and y-coordinate of revolute joint C, revolute joint D, and effector E for each of the n sample points, for a total of an additional $6n$ variables. Further, a single error variable e is included in the model that represents the maximum of all distances between effector positions Ei and a corresponding sample point Ti. In some embodiments, some or all variables for coordinates are bounded within a certain range, for example from $-10$ to 10; some or all link lengths are bounded within a certain range, for example from 0 to 10; and the ratio w is bounded within a certain range, for example from 0 to 4. Furthermore, in some embodiments it is beneficial for filtering of generated solutions to bound the domain of e with the upper error bound eu.

The constraints included in the mathematical model employed in global optimization solver 220 define relationships between the above-described variables. Global optimization solver 220 finds values for the variables to satisfy all such constraints, which are set forth in Equations 1-12. The first set of constraints, Equations 1A-1D, forces the coordinates to be separated by distances corresponding to the lengths of the bars. Thus, Equation 1A describes the constraint associated with frame AB, Equation 1B describes the constraint associated with crank AC, Equation 1C describes the constraint associated with rocker BD, and Equation 1D describes the constraint associated with coupler CDE:

$$(A_x - B_{x_i})^2 + (A_y - B_{y_i})^2 = AB^2 \ \forall i \in [1, n] \quad (1A)$$

$$(A_x - C_{x_i})^2 + (A_y - C_{y_i})^2 = AC^2 \ \forall i \in [1, n] \quad (1B)$$

$$(B_{x_i} - D_{x_i})^2 + (B_{y_i} - D_{y_i})^2 = BD^2 \ \forall i \in [1, n] \quad (1C)$$

$$(C_{x_i} - E_{x_i})^2 + (C_{y_i} - E_{y_i})^2 = CE^2 \ \forall i \in [1, n] \quad (1D)$$

In some embodiments, a constraint is employed that defines the error variable e as the upper bound of the squared distance from point Ei to points Ti, as set forth in Equation 2:

$$(T_{x_i} - E_{x_i})^2 + (T_{y_i} - E_{y_i})^2 \le e \ \forall i \in [1, n] \quad (2)$$

In some embodiments, a constraint is employed that ensures that revolute joint C, revolute joint D, and effector E are colinear. In one such embodiment, the fact that the components of CD and CE respect the ratio w is also implemented, as set forth in Equations 3 and 4:

$$w \cdot (D_{x_i} - C_{x_i}) = E_{x_i} - C_{x_i} \ \forall i \in [1, n] \quad (3)$$

$$w \cdot (D_{y_i} - C_{y_i}) = E_{y_i} - C_{y_i} \ \forall i \in [1, n] \quad (4)$$

It is noted that knowledge of the lengths of frame AB, crank AC, rocker BD, and coupler CDE crank is sometimes not sufficient to determine the sole configuration of a four-bar linkage mechanism. One such scenario is illustrated in FIG. 4. FIG. 4 schematically illustrates four-bar linkage 100 in a first operating configuration and a second operating configuration, according to various embodiments of the invention. As shown, the same configuration of link lengths can be arranged into two distinct mechanisms, each with different output coupler curves. The two distinct mechanisms share an axis of symmetry along a line 401 defined by revolute joints B and C. That is, coupler CDE can be relocated to position CDE' and rocker BD can be relocated to position BD'. As a result, for each target point Ti, the coordinates for Ei need to be on the same side of the segment BCi (that is, the ith position of line 401). Since Ti and Ei must lie close to one another, constraining either one is equivalent. The cross-product of vectors BC and BE changes sign depending on which side of BC effector E is located. Thus, by constraining the sign of the cross-product to be the same for all positions, we constrain the configuration. Therefore the two mutually exclusive constraints, set forth in Equations 5A and 5B, are included in the mathematical model. Thus, global optimization solver 220 can be executed with a mathematical model that includes Equation 5A, which represents one of the two symmetrical linkage solution spaces, then global optimization solver 220 can be executed with a mathematical model that includes Equation 5B, which represents the other of the two symmetrical linkage solution spaces.

$$(T_{x_i} - C_{x_i})(B_y - C_{y_i}) \ge (T_{y_i} - C_{y_i})(B_x - C_{x_i}) \ \forall i \in [1, n] \quad (5A)$$

$$(T_{x_i} - C_{x_i})(B_y - C_{y_i}) \le (T_{y_i} - C_{y_i})(B_x - C_{x_i}) \ \forall i \in [1, n] \quad (5B)$$

In some embodiments, additional constraints are included in the mathematical model executed in global optimization solver 220 that enforce the Grashof condition, which states that the shortest link in a four-bar linkage can fully rotate only if the combined length of the shortest and longest links is smaller than the combined length of the remaining two links. Equations 6-11 enforce this constraint on solutions generated by global optimization solver 220:

$$AB \ge AC \quad (6)$$

$$BD \ge AC \quad (7)$$

$$CD > AC \quad (8)$$

$$CD + BD \ge AC + AB + s \quad (9)$$

$$AB + CD \ge AC + BD + s \quad (1D)$$

$$AB + BD \ge AC + CD + s \quad (11)$$

It is noted that in Equations 9-11, a security constant s is included to avoid equality. Otherwise, a mechanism that meets the constraints described by Equations 9-11 could fold over itself completely, a state in which the behavior of the mechanism is indeterminate, since at such a state the mechanism can unfold in either of two ways. A mechanism that can enter such a state is generally undesirable, since additional control is typically required to achieve deterministic motion. Further, high mechanical stress is typically associated with such an indeterminate state. In some embodiments, security constant s can be tuned to a desired tolerance. For example, in some embodiments, s is set to a relatively low value, e.g., 0.1, to minimally reduce the search space while still preventing mechanisms capable of entering the above-described indeterminate state.

Generally, global optimization solver 220 includes an objective function that is either maximized or minimized to generate solutions. In some embodiments, the objective function of global optimization solver 220 is a distance between two continuous curves. Specifically, the two continuous curves are input coupler curve 201 and an output coupler curve that is produced by a four-bar linkage mechanism 202 generated by global optimization solver 220 as a candidate solution. For example, the continuous metric Q can be implemented in global optimization solver 220 as the objective function to be minimized. In some embodiments, global optimization solver 220 minimizes Q over a very large number of points in input coupler curve 201 and the output coupler curve that is produced by a candidate solution. For computational efficiency, in some embodiments, the mathematical model is greatly reduced in size and complexity by minimizing Q over carefully selected points that approximate the candidate output coupler curve and input coupler curve 201. In such embodiments, the error variable e is defined in an analogous way to Q, but for a low resolution approximation of the curve. Thus, in such embodiments, the objective function can be minimizing error variable e, which is the maximum distance between a candidate output coupler curve and input coupler curve 201 at the sample points.

In some embodiments, the objective function of global optimization solver 220 can be any other suitable design metric associated with a four-bar linkage mechanism. Thus, rather than minimizing a distance between two continuous curves, in such embodiments global optimization solver 220 may be configured to minimize a volume of operation of four-bar linkage mechanisms 202, a length of a particular link in four-bar linkage mechanisms 202, and the like.

In embodiments in which input coupler curve 201 is approximated by n sample points, there is the possibility that a candidate output coupler curve can pass through the n sample points with high precision, yet not produce the motion of the desired output coupler curve. One such scenario is illustrated in FIG. 5. FIG. 5 schematically illustrates input coupler curve 201, which is approximated by four sample points 501. As shown, a candidate output coupler curve 510 that is produced by a solution generated by global optimization solver 220 passes exactly through all four sample points 501, but is still a poor approximation of input coupler curve 201. If the number of sample points 501 is increased for a tighter fit between candidate output coupler curve 510 and input coupler curve 201, the mathematical model employed by global optimization solver 220 grows proportionately, including additional variables and non-convex constraints. In some embodiments, to maintain a smaller search space for global optimization solver 220 while maintaining sufficient precision, an area constraint is also included in global optimization solver 220. The area constraint causes the area of a candidate output coupler curve to approximate the area of input coupler curve 201. As a result, global optimization solver 220 does not search through many unworkable solutions.

In some embodiments, the area of a coupler curve is assumed to vary linearly with the ratio w of CE over CD. In such embodiments, area is a constant computed from input coupler curve 201, for example using Equation 12:

$$\text{Area} = \pi \cdot AC^2 |CE/CD - 1| \qquad (12)$$

Returning to FIG. 2, end condition module 230 is a software application configured to determine whether global optimization solver 220 should halt execution, based on whether an end condition is satisfied. In some embodiments, an end condition is the generation of a solution by global optimization solver 220 that meets or exceeds a threshold performance or value. For example, in such embodiments, when Q is less than a specified tolerance value T, end condition module 230 notifies global optimization solver 220 that an end condition has been satisfied and global optimization solver 220 halts execution. Alternatively or additionally, in some embodiments, an end condition is the elapsing of a timeout condition. That is, after execution of global optimization solver 220 exceeds a specified time interval, end condition module 230 notifies global optimization solver 220 that an end condition has been satisfied and global optimization solver 220 halts execution. Alternatively or additionally, in some embodiments, an end condition is that a specified number of solutions have been generated by global optimization solver 220. That is, after global optimization solver 220 generates a number of solutions that exceeds a specified value, end condition module 230 notifies global optimization solver 220 that an end condition has been satisfied and global optimization solver 220 halts execution. In such embodiments, a solution is generally included in the number of solutions used to satisfy the end condition when the solution satisfies a specified quality threshold, such as tolerance value T. Otherwise, solutions that do not exceed tolerance value T are not included in the number of solutions used to satisfy the end condition. In yet other embodiments, end condition module 230 may implement any other technically feasible end condition to halt execution of global optimization solver 220.

Curve generation module 240 is a software application configured to generate input coupler curve 201 in certain embodiments. For example, in some embodiments, a user provides a sketch, drawing, data or other user input 204 that represents a target output coupler curve, and curve generation module 240 generates a suitable mathematical model based on the sketch or drawing. Alternatively or additionally, a user may generate such a sketch or drawing via a user interface associated with curve generation module 240, for example by positioning control points on a graphical interface. In either case, curve generation module 240 then transmits input coupler curve 201 to curve sampling module 210.

FIG. 6 illustrates a computing device 600 configured to implement one or more aspects of the present invention. Computing device 600 may be a desktop computer, a laptop computer, a smart phone, a personal digital assistant (PDA), tablet computer, or any other type of computing device configured to receive input, process data, and display images, and is suitable for practicing one or more embodiments of the present invention. Computing device 600 is configured to run linkage synthesizing application 200 that resides in a memory 610. In some embodiments, computing device 600 is also configured to run one or more of curve sampling module 210, global optimization solver 220, end condition module 230 and/or curve generation module 240. It is noted that the computing device described herein is illustrative and that any other technically feasible configurations fall within the scope of the present invention.

As shown, computing device 600 includes, without limitation, an interconnect (bus) 640 that connects a processing unit 650, an input/output (I/O) device interface 660 coupled to input/output (I/O) devices 680, memory 610, a storage 630, and a network interface 670. Processing unit 650 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 650 may be any technically feasible hardware unit capable of processing data and/or executing software applications, including linkage synthesizing application 200. Further, in the context of this disclosure, the computing elements shown in computing device 600 may correspond to a physical computing system (e.g., a system in a data center) or may be a virtual computing instance executing within a computing cloud.

I/O devices 680 may include devices capable of providing input, such as a keyboard, a mouse, a touch-sensitive screen, and so forth, as well as devices capable of providing output, such as a display device 681. Additionally, I/O devices 680 may include devices capable of both receiving input and providing output, such as a touchscreen, a universal serial bus (USB) port, and so forth. I/O devices 680 may be configured to receive various types of input from an end-user of computing device 600, and to also provide various types of output to the end-user of computing device 600, such as displayed digital images or digital videos. In some embodiments, one or more of I/O devices 680 are configured to couple computing device 600 to a network 605.

Network 605 may be any technically feasible type of communications network that allows data to be exchanged between computing device 600 and external entities or devices, such as a web server or another networked computing device. For example, network 605 may include a wide area network (WAN), a local area network (LAN), a wireless (WiFi) network, and/or the Internet, among others.

Memory 610 may include a random access memory (RAM) module, a flash memory unit, or any other type of memory unit or combination thereof. Processing unit 650, I/O device interface 660, and network interface 670 are configured to read data from and write data to memory 610. Memory 610 includes various software programs that can be executed by processor 650 and application data associated with said software programs, including linkage synthesizing application 200, sampling module 210, global optimization solver 220, end condition module 230 and/or curve generation module 240.

FIG. 7 is a flowchart of method steps for designing a four-bar linkage mechanism, according to various embodiments of the present invention. Although the method steps are described in conjunction with the systems of FIGS. 1-6, persons skilled in the art will understand that any system configured to perform the method steps, in any order, is within the scope of the present invention.

As shown, a method 700 begins at step 701, where linkage synthesizing application 200 receives a target curve that represents a motion path to be approximated with a four-bar linkage, such as input coupler curve 201. In some embodiments, linkage synthesizing application 200 receives the target curve from curve generation module 240.

In step 702, linkage synthesizing application 200 performs a curve-sampling operation using curve sampling module 210. In some embodiments, linkage synthesizing application 200 samples n points from input coupler curve 201, where n can be a user-selected value, a default value, or any other suitable number of sample points.

In step 703, linkage synthesizing application 200 selects one of the two symmetrical linkage solution spaces associated with a particular four-bar linkage mechanism.

In step 704, linkage synthesizing application 200 generates a solution using global optimization solver 220. The constraints implemented by global optimization solver 220 include one of Equation 5A or 5B, depending on which of the two symmetrical linkage solution spaces was selected in step 703.

In step 705, linkage synthesizing application 200 determines whether the solution generated in step 704 satisfies a quality threshold, such as tolerance value T. If yes, method 700 proceeds to step 706; if no method 700 proceeds back to step 704 for the generation of one or more further solutions.

With respect to determining whether a solution satisfies a quality threshold, as set forth above, global optimization solver 220 minimizes Q as part of searching for the solution. Thus, global optimization solver 220 has already calculated Q for the candidate solution. For example, in some embodiments, Q represents the maximum distance between an output coupler curve generated by the solution and input coupler curve 201. In such embodiments, global optimization solver 220 can make the determination in step 705 by comparing Q (which is already calculated for the candidate solution) and tolerance value T.

In step 706, linkage synthesizing application 200 stores the solution determined in step 705 to satisfy a quality threshold.

In step 707, linkage synthesizing application 200 determines whether an end condition has been satisfied, using end condition module 230. Suitable end conditions include a timeout condition being met or exceeded, a targeted number of candidate solutions being found by global optimization solver 220, a singe candidate solution being found by global optimization solver 220 that exceeds a certain quality threshold, and the like. If yes, method 700 proceeds to step 708; if no, method 700 proceeds back to step 704 for the generation of one or more further solutions.

In step 708, linkage synthesizing application 200 determines whether there is a remaining symmetrical linkage solution space (of the two possible symmetrical linkage solution spaces). If yes, method 700 proceeds back to step 703, where solutions using the other possible linkage solution space are then generated; if no, method 700 proceeds to step 708.

In step 708, linkage synthesizing application 200 selects one or more of the best solutions generated by global optimization solver 220. In some embodiments, a single best solution is selected in step 708. In other embodiments, a set of best solutions is selected in step 708, based on the quality of the solutions with respect to minimized Q. In embodiments in which a set of best solutions is selected in step 708, a user can then select a final four-bar linkage mechanism based on secondary design constraints, such as volume required for the four-bar linkage mechanism.

In step 709, linkage synthesizing application 200 returns the best solution or the set of best solutions to a user.

FIG. 8 is a flowchart of method steps for designing a four-bar linkage mechanism, according to various other embodiments of the present invention. Specifically, a four-bar linkage mechanism is designed via multiple samplings of input coupler curve 201. Although the method steps are described in conjunction with the systems of FIGS. 1-7, persons skilled in the art will understand that any system configured to perform the method steps, in any order, is within the scope of the present invention.

As shown, a method 800 begins at step 801, where linkage synthesizing application 200 receives a target curve that represents a motion path to be approximated with a four-bar linkage, such as input coupler curve 201. In some embodiments, linkage synthesizing application 200 receives the target curve from curve generation module 240.

In step 802, linkage synthesizing application 200 generates M curve samplings of input coupler curve 201. In some embodiments, a value for M is a user-selected value. In some embodiments, each of the M curve samplings includes a different number of sampling points, whereas in other embodiments two or more of the M curve samplings may include an identical number of sampling point, but have different locations for the sample points in each of the two or more curve samplings.

In step 803, linkage synthesizing application 200 selects one of the M curve samplings generated in step 802.

In step 804, linkage synthesizing application 200 generates and stores one or more solutions for the selected curve sampling. In some embodiments, techniques employed in steps 704-709 are employed in step 804.

In step 805, linkage synthesizing application 200 determines whether there is a remaining curve sampling of the M curve samplings generated in step 802. If yes, method 800 proceeds back to step 803, and the next curve sampling is selected; if no, method 800 proceeds to 806.

In step 805, linkage synthesizing application 200 returns the best solution or set of solutions to the user. In some embodiments, linkage synthesizing application 200 returns the best solution for each of the M sampling curves, whereas in other embodiments, linkage synthesizing application 200 returns the best solutions irrespective of which curve sampling was employed in the generation of the solutions.

Determining one or more solutions by performing method 800 can inform the user how the quality of solutions determined by global optimization solver 220 is affected by the point sampling of input coupler curve 201.

In sum, embodiments of the present invention provide techniques for synthesizing a four-bar linkage mechanism based on an input coupler curve. The input couple curve is represented by a relatively small number of sample points. A global optimization solver then generates one or more solutions based on the sample points in conjunction with one or more additional constraints that make the problem more tractable. Solutions are generated by minimizing an object function, such as a distance between the input coupler curve and an output coupler curve that is generated by a candidate four-bar linkage solution. A four-bar linkage solution so synthesized is guaranteed to produce a coupler curve that approximates the input coupler curve within a specified tolerance value.

At least one advantage of the disclosed techniques is that a four-bar linkage or a set of four-bar linkages that operates along a desired output curve can be generated more quickly and with greater computational efficiency relative to prior art approaches. Further, because multiple mechanisms that produce the desired output curve can be generated, a designer can select a final design from among multiple design options based on secondary design constraints.

1. In some embodiments, a computer-implemented method for designing a four-bar linkage mechanism, the method comprises receiving an input coupler curve that defines motion within a plane with respect to a point that is to be included on the four-bar linkage mechanism; generating a set of sample points, wherein each point in the set of sample points corresponds to a different location on the input coupler curve; and implementing a global optimization solver to generate a first design for the four-bar linkage mechanism, wherein the first design includes at least one value for each geometric variable included in a set of geometric variables associated with the four-bar linkage, at least one of the geometric variables being based on one of the sample points, and wherein the first design generates an output coupler curve that approximates the input coupler curve.

2. The computer-implemented method of clause 1, wherein the at least one value for each geometric variable included in the set of geometric variables is based on at least one geometric constraint associated with the four-bar linkage mechanism and an objective function.

3. The computer-implemented method of clauses 1-2, wherein generating the first design comprises minimizing the objective function to generate the at least one value for each geometric variable included in the set of geometric variables.

4. The computer-implemented method of any of clauses 1-3, wherein the objective function is based on an error variable that represents a maximum distance from the output coupler curve to a sample point on the input coupler curve.

5. The computer-implemented method of any of clauses 1-4, wherein the objective function comprises a normalized Hausdorff distance between the output coupler curve and the input coupler curve.

6. The computer-implemented method of any of clauses 1-5, wherein at least one geometric constraint associated with the four-bar linkage mechanism comprises an area constraint that indicates a target area value for the output coupler curve.

7. The computer-implemented method of any of clauses 1-6, wherein at least one geometric constraint associated with the four-bar linkage mechanism enforces a Grashof condition in the planar four-bar linkage mechanism.

8. The computer-implemented method of any of clauses 1-7, wherein generating the set of sample points comprises: identifying one or more features on the input coupling curve; and assigning a different sample point to each feature included in the one or more features.

9. The computer-implemented method of any of clauses 1-8, wherein generating the set of sample points further comprises uniformly distributing a plurality of additional sample points on the input coupling curve between a first feature included in the one or more features and a second feature included in the one or more features.

10. The computer-implemented method of any of clauses 1-9, wherein the set of geometric variables includes at least one redundant variable.

11. In some embodiments, a non-transitory computer readable medium storing instructions that, when executed by a processor, cause the processor to perform the steps of receiving an input coupler curve that defines motion within a plane with respect to a point that is to be included on the four-bar linkage mechanism; generating a set of sample points, wherein each point in the set of sample points corresponds to a different location on the input coupler curve; and implementing a global optimization solver to generate a first design for the four-bar linkage mechanism, wherein the first design includes at least one value for each geometric variable included in a set of geometric variables associated with the four-bar linkage, at least one of the geometric variables being based on one of the sample points, and wherein the first design generates an output coupler curve that approximates the input coupler curve.

12. The non-transitory computer readable medium of clause 11, wherein the at least one value for each geometric variable included in the set of geometric variables is based on at least one geometric constraint associated with the four-bar linkage mechanism and an objective function.

13. The non-transitory computer readable medium of any of clauses 11-12, wherein generating the first design comprises minimizing the objective function to generate the at least one value for each geometric variable included in the set of geometric variables.

14. The non-transitory computer readable medium of any of clauses 11-13, wherein the objective function is based on an error variable that represents a maximum distance from the output coupler curve to a sample point on the input coupler curve.

15. The non-transitory computer readable medium of any of clauses 11-14, wherein the objective function comprises a normalized Hausdorff distance between the output coupler curve and the input coupler curve.

16. The non-transitory computer readable medium of any of clauses 11-15, wherein at least one geometric constraint associated with the four-bar linkage mechanism comprises an area constraint that indicates a target area value for the output coupler curve.

17. The non-transitory computer readable medium of any of clauses 11-16, wherein at least one geometric constraint associated with the four-bar linkage mechanism enforces a Grashof condition in the planar four-bar linkage mechanism.

18. The non-transitory computer readable medium of any of clauses 11-17, wherein the set of geometric variables includes coordinates associated with a first revolute joint included in the four-bar linkage mechanism, coordinates associated with a second revolute joint included in the four-bar linkage mechanism, a length of a crank included in the four-bar linkage mechanism, a length of a rocker included in the four-bar linkage mechanism, a length of a coupler included in the four-bar linkage mechanism, and a length of a portion of the coupler.

19. The non-transitory computer readable medium of any of clauses 11-18, wherein the portion of the coupler is defined as the distance from a revolute joint connecting the coupler to the crank to a revolute joint connecting the coupler to the rocker.

20. In some embodiments, a system comprises a memory that stores instructions, and a processor that is coupled to the memory and, when executing the instructions, is configured to receive an input coupler curve that defines motion within a plane with respect to a point that is to be included on the four-bar linkage mechanism; generate a set of sample points, wherein each point in the set of sample points corresponds to a different location on the input coupler curve; and implement a global optimization solver to generate a first design for the four-bar linkage mechanism, wherein the first design includes at least one value for each geometric variable included in a set of geometric variables associated with the four-bar linkage, at least one of the geometric variables being based on one of the sample points, and wherein the first design generates an output coupler curve that approximates the input coupler curve.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

We claim:

1. A computer-implemented method for designing a four-bar linkage mechanism, the method comprising:
receiving, as an input, a target coupler curve that defines motion within a plane with respect to a point that is to be included on the four-bar linkage mechanism, wherein the target coupler curve represents a motion path produced by the four-bar linkage mechanism;
generating, based on the target coupler curve, a set of sample points, wherein each point in the set of sample points corresponds to a different location on the target coupler curve; and
implementing a global optimization solver to generate a first design for the four-bar linkage mechanism, wherein the first design includes at least one value for each geometric variable included in a set of geometric variables associated with the four-bar linkage mechanism, at least one of the geometric variables being based on one of the sample points, wherein the first design generates an output coupler curve that approximates the target coupler curve, and wherein a distance between the output coupler curve and the target coupler curve at one or more of the sample points is within a specified tolerance value.

2. The method of claim 1, wherein the at least one value for each geometric variable included in the set of geometric variables is based on at least one geometric constraint associated with the four-bar linkage mechanism and an objective function.

3. The method of claim 2, wherein generating the first design comprises minimizing the objective function to generate the at least one value for each geometric variable included in the set of geometric variables.

4. The method of claim 2, wherein the objective function is based on an error variable that represents a maximum distance from the output coupler curve to a sample point on the target coupler curve.

5. The method of claim 2, wherein the objective function comprises a normalized Hausdorff distance between the output coupler curve and the target coupler curve.

6. The method of claim 2, wherein at least one geometric constraint associated with the four-bar linkage mechanism comprises an area constraint that indicates a target area value for the output coupler curve.

7. The method of claim 2, wherein at least one geometric constraint associated with the four-bar linkage mechanism enforces a Grashof condition in the four-bar linkage mechanism.

8. The method of claim 1, wherein generating the set of sample points comprises:
identifying one or more features on the target coupler curve; and
assigning a different sample point to each feature included in the one or more features.

9. The method of claim 8, wherein generating the set of sample points further comprises uniformly distributing a plurality of additional sample points on the target coupler curve between a first feature included in the one or more features and a second feature included in the one or more features.

10. The method of claim 1, wherein the set of geometric variables includes at least one redundant variable.

11. The method of claim 1, further comprising sampling a high-resolution array of sample points derived from the target coupler curve, wherein generating the set of sample points comprises selecting the set of sample points from among the high-resolution array of sample points.

12. A non-transitory computer readable medium storing instructions that, when executed by a processor, cause the processor to perform the steps of:
receiving, as an input, a target coupler curve that defines motion within a plane with respect to a point that is to be included on a four-bar linkage mechanism, wherein the target coupler curve represents a motion path produced by the four-bar linkage mechanism;
generating, based on the target coupler curve, a set of sample points, wherein each point in the set of sample points corresponds to a different location on the target coupler curve; and
implementing a global optimization solver to generate a first design for the four-bar linkage mechanism, wherein the first design includes at least one value for each geometric variable included in a set of geometric variables associated with the four-bar linkage mechanism, at least one of the geometric variables being based on one of the sample points, wherein the first design generates an output coupler curve that approximates the target coupler curve, and wherein a distance between the output coupler curve and the target coupler curve at one or more of the sample points is within a specified tolerance value.

13. The non-transitory computer readable medium of claim 12, wherein the at least one value for each geometric variable included in the set of geometric variables is based on at least one geometric constraint associated with the four-bar linkage mechanism and an objective function.

14. The non-transitory computer readable medium of claim 13, wherein generating the first design comprises minimizing the objective function to generate the at least one value for each geometric variable included in the set of geometric variables.

15. The non-transitory computer readable medium of claim 13, wherein the objective function is based on an error variable that represents a maximum distance from the output coupler curve to a sample point on the target coupler curve.

16. The non-transitory computer readable medium of claim 13, wherein the objective function comprises a normalized Hausdorff distance between the output coupler curve and the target coupler curve.

17. The non-transitory computer readable medium of claim 13, wherein at least one geometric constraint associated with the four-bar linkage mechanism comprises an area constraint that indicates a target area value for the output coupler curve.

18. The non-transitory computer readable medium of claim 13, wherein at least one geometric constraint associated with the four-bar linkage mechanism enforces a Grashof condition in the four-bar linkage mechanism.

19. The non-transitory computer readable medium of claim 12, wherein the set of geometric variables includes coordinates associated with a first revolute joint included in the four-bar linkage mechanism, coordinates associated with a second revolute joint included in the four-bar linkage mechanism, a length of a crank included in the four-bar linkage mechanism, a length of a rocker included in the four-bar linkage mechanism, a length of a coupler included in the four-bar linkage mechanism, and a length of a portion of the coupler.

20. The non-transitory computer readable medium of claim 19, wherein the portion of the coupler is defined as a distance from a revolute joint connecting the coupler to the crank to a revolute joint connecting the coupler to the rocker.

21. A system comprising:
   a memory that stores instructions, and
   a processor that is coupled to the memory and, when executing the instructions,
      is configured to:
         receive, as an input, a target coupler curve that defines motion within a plane with respect to a point that is to be included on a four-bar linkage mechanism, wherein the target coupler curve represents a motion path produced by the four-bar linkage mechanism;
         generate, based on the target coupler curve, a set of sample points, wherein each point in the set of sample points corresponds to a different location on the target coupler curve; and
      implement a global optimization solver to generate a first design for the four-bar linkage mechanism, wherein the first design includes at least one value for each geometric variable included in a set of geometric variables associated with the four-bar linkage mechanism, at least one of the geometric variables being based on one of the sample points, wherein the first design generates an output coupler curve that approximates the target coupler curve, and wherein a distance between the output coupler curve and the target coupler curve at one or more of the sample points is within a specified tolerance value.

* * * * *

UNITED STATES PATENT AND TRADEMARK OFFICE
CERTIFICATE OF CORRECTION

PATENT NO. : 10,915,672 B2
APPLICATION NO. : 15/693290
DATED : February 9, 2021
INVENTOR(S) : Hyunmin Cheong et al.

It is certified that error appears in the above-identified patent and that said Letters Patent is hereby corrected as shown below:

On the Title Page

Item (56) References Cited:
Please delete "Osmanliog ˘|u lu et al, "Multilayer matching of metric structures using hierarchically well-separated trees" 2016.*" and insert --Osmanlioğlu et al., "Multilayer matching of metric structures using hierarchically well-separated trees" 2016.*--.

Signed and Sealed this
First Day of June, 2021

Drew Hirshfeld
*Performing the Functions and Duties of the
Under Secretary of Commerce for Intellectual Property and
Director of the United States Patent and Trademark Office*